United States Patent [19]
Thomas et al.

[11] 3,854,964
[45] Dec. 17, 1974

[54] LEAD SILICATE HIGH VOLTAGE VACUUM TUBE GLASS ENVELOPE

[75] Inventors: George L. Thomas, Chesterland; Leonard M. Reitz, South Euclid, both of Ohio

[73] Assignee: General Electric Company, Schenectady, N.Y.

[22] Filed: Sept. 24, 1973

[21] Appl. No.: 399,942

Related U.S. Application Data

[63] Continuation-in-part of Ser. No. 234,349, March 13, 1972, abandoned.

[52] U.S. Cl. ............... 106/53, 313/480, 252/478
[51] Int. Cl. ......... C03c 3/10, C03c 3/24, C03c 3/30
[58] Field of Search .......... 106/53; 252/478; 313/92

[56] References Cited
UNITED STATES PATENTS

| | | | |
|---|---|---|---|
| 2,025,099 | 12/1935 | Gelsthays | 106/53 |
| 2,762,713 | 9/1956 | Davis et al. | 106/53 |
| 3,464,932 | 9/1969 | Connelly et al. | 106/53 |

FOREIGN PATENTS OR APPLICATIONS

| | | | |
|---|---|---|---|
| 764,575 | 12/1956 | Great Britain | 106/53 |

OTHER PUBLICATIONS

Singer, 6, Absorption of X-Rays by Lead Glasses & Lead–Barium Glasses, Journal of Research of the Nat'l. Bureau of Standards, Vol. 16, March 1936, Research Paper RP870.

Primary Examiner—Winston A. Douglas
Assistant Examiner—Mark Bell
Attorney, Agent, or Firm—John F. McDevitt; Lawrence R. Kempton; Frank L. Neuhauser

[57] ABSTRACT

Glass composition having a high absorption of X-radiation, particularly in the wavelength region from 0.3–0.7 Å, for use in fabricating high voltage vacuum tube glass envelopes. The glass compositions are a type of lead oxide containing glass which can be characterized as having an aggregate content of barium oxide with antimony oxide and cadmium oxide in excess of 10% by weight and further having an aggregate content of lead oxide with barium oxide, antimony oxide and cadmium oxide in excess of 55% by weight.

4 Claims, No Drawings

LEAD SILICATE HIGH VOLTAGE VACUUM TUBE GLASS ENVELOPE

BACKGROUND OF THE INVENTION

This invention relates to X-radiation absorbing glass compositions. This application is a continuation-in-part of our copending application entitled "RADIATION ABSORBING GLASS," Ser. No. 234,349, filed Mar. 13, 1972, and now abandoned.

High voltage vacuum tubes such as certain tubes commonly used as electronic components in commercial television receiver sets operate in the range from 20–40 kv and can emit harmful X-rays. Concern over the release of harmful radiation from high voltage rectifier tubes and shunt regulator tubes has led to the need for higher energy absorbing glasses. Conventionally, one solution to this problem has been to increase the absorption of the glass in these areas for X-radiation by incorporating a heavy element therein. For example, lead oxide has been used extensively to reduce the level of X-radiation transmission through such vacuum tubes as well as television tube face-plate and funnel glasses. Also, since the absorption of X-radiation by a material is also a function of the thickness of the material, a second conventional solution has been to increase the wall thickness of the glass. The two conventional solutions, then, to an X-ray transmission problem has been to increase the content of lead oxide in the glass and/or to increase the wall thickness of the glass.

The first solution has not been fully satisfactory with respect to high voltage vacuum tubes in general because increasing lead oxide content beyond a certain range adversely affects the melting and viscosity characteristics of the glass. The second conventional solution is particularly unsatisfactory in areas of glass-to-metal or glass-to-glass seals because good sealing conditions are difficult to obtain and because residual mechanical stresses in the glass are harder to avoid.

Color television receiving sets are operated at voltages in the 20–40 kv region. In the event of mechanical or electrical malfunction or insufficient consideration of safety factors in the design of such sets, harmful X-radiation in the range of 0.3 – 0.7 A can penetrate component glass structures and be transmitted outside the television set. Escape of injurious X-radiation may also be produced by increase in voltage which causes higher energy, shorter wavelength and more penetrating radiation to be given off. Concern is particularly great over the possible transmission of the "hard" or more penetrating X-radiation produced by voltages of 37.5 kv and greater. While presently the glasses used in the envelopes of these tubes do absorb the majority of the X-radiation being generated, there are lower limits being proposed on the permissible X-radiation escaping from TV sets so that new glasses or envelopes of greater thickness may be a future requirement.

It is also known that greater X-ray absorption may be provided by glass compositions having certain oxides in addition to lead oxide which reduce the transmittance of X-radiation in the wavelength range 0.3 – 0.7 A. One such known glass composition employs up to about 20% by weight strontium oxide in either partial or complete substitution for the lead oxide to avoid discoloration problems in picture tubes resulting from the use of the latter oxide. A different glass composition is described in copending U.S. Pat. application, Ser. No. 100,407, filed Dec. 21, 1970 in the name of George L. Thomas and entitled "Radiation Absorbing Glass" which absorbs X-radiation in the wavelength range from 0.3 – 0.7 A. and which has as its essential constituents by weight: 40–48% $SiO_2$, 3.5 – 5.5% $Al_2O_3$, 0.8 – 2.8% $Na_2O$, 9–12% $K_2O$, 28–37% PbO, 0–3% CaO and 2–10% BaO. In the latter-defined glass composition, it was found that adding BaO to this lead glass improved the X-radiation absorption in the "hard" X-ray region of 30–40 kv.

SUMMARY OF THE INVENTION

It has now been found that still further additions of compatible oxides can be made in lead glass compositions as hereinafter defined to provide from 2 to 4 times more absorption for X-rays produced in the 30–40 kv region than standard glasses now in use. More particularly, the present glass compositions which are highly absorbent to X-radiation throughout the entire wavelength range from 0.3 – 0.7 A comprise, by weight: 30–40% $SiO_2$, 3–7% $K_2O$, 0–2% $Na_2O$, 0–3% $Al_2O_3$, 35–50% PbO, 0–15% BaO, 0–15% $Sb_2O_3$ and 0–15% CdO wherein the aggregate total of BaO + $Sb_2O_3$ + CdO is greater than 10% and the aggregate total of BaO + PbO + $Sb_2O_3$ + CdO is greater than 55%. Certain other compatible oxides such as $B_2O_3$, ZnO, SrO and $ZrO_2$ may be added in minor amounts up to about 5% to the present glass compositions which can further include incidental impurities, residual fluxes and refining agents in addition to the above-specified essential ingredients.

DESCRIPTION OF THE PREFERRED EMBODIMENTS

In providing glass compositions which are especially effective in absorbing the "hard" X-radiation at the 37.5 kv region and above which can be very harmful, it has been found that glass compositions containing the following essential ingredients in the ranges indicated are particularly suitable for manufacture of glass tubing as well as the fabrication and function of high voltage vacuum tubes: 30–40% $SiO_2$, 3–7% $K_2O$, 0–2% $Na_2O$, 0–3% $Al_2O_3$, 35–50% PbO, 0–15% BaO, 0–15% $Sb_2O_3$ and 0–15% CdO wherein the aggregate total of BaO + $Sb_2O_3$ + CdO is greater than 10% and the aggregate total of BaO + PbO + $Sb_2O_3$ + CdO is greater than 55%. Variations may be made within the ranges indicated to achieve the particular desired physical and chemical properties of the glass compositions for the contemplated product applications. The present glass compositions combine lead, barium, antimony and cadmium as a silicate glass in proportions such that greater protection is provided against the "hard" X-radiation than is afforded by the conventionally used glasses. Further, the concentration of these elements in the present glass compositions is as great as the other physical properties required in these glasses as manufacture and use will permit.

In recognition of the relative X-ray absorptivity of PbO in the glass, there is maintained a high PbO content with an upper concentration being maintained so as not to deleteriously affect the viscous property of the glass. For many vacuum tube applications, the glass if first formed into tubing by commercial methods such as Danner, down-draw, up-draw or Vello which require that the glass remain free of devitrification and have a working range suitable for the particular tube drawing process. It is also important for glasses to be employed as television tube parts that the glass seal properly with other glasses and with metals. By way of illustration, the glass should also be suitable for sealing to such metal lead wires as "Sealmet 4" which is a product manufactured by Allegheny Ludlum Steel Corporation or "Carpenter Glass Sealing 426 Alloy" which is a product made by the Carpenter Steel Company. For all these reasons, there is need to select the proper content by weight of each constituent within the ranges above specified so that the glass has an average coefficient of thermal expansion in the range of approximately $85-93 \times 10^{-7}$ cm/cm/°C from 0°C to 300°C while also having a working range greater than 240°C and preferably about 250°–300°C.

In further defining the glass compositions in accordance with the foregoing considerations, the PbO content is limited by the necessity of having 30–40% $SiO_2$ for a proper viscosity-temperature characteristic to permit commercial tube drawing. By keeping the $Al_2O_3$ content in a narrow range of 2–3%, the working range of the glass is lengthened. More than 3% $Al_2O_3$ produces some devitrification in the present glasses. Alkali metal oxides, in the ranges above specified, further reduce any tendency of the glass to devitrify. However, if more than about 2% $Na_2O$ is used, the glass becomes too fluid for a number of sealing applications.

The remaining essential constituents in the present glass compositions, namely an aggregate combination of BaO with $Sb_2O_3$ and CdO to constitute more than 10% by weight in the glass is based primarily upon a different consideration. More particularly, these constituents have been found to broaden the X-ray absorption band compared with a glass having only PbO and with such broader absorption band including the region of peak X-ray output for at least some high voltage vacuum tubes including color television picture tubes, high voltage rectifiers, high voltage shunt regulators and the like. That such a combination of elements would function in this manner is the result of the combined individual absorption characteristics of the constituent oxides. The broadened absorption band lying in the X-ray range which is critical in connection devices operating at 30–40 kv is a property of this glass arising out of the particular combination of the oxides listed above when employed in the proportions by weight herein defined. It is necessary to maintain the aggregate content of PbO with BaO, $Sb_2O_3$ and CdO greater than 55 weight percent in the glass compositions of the present invention to secure the desired broader X-ray absorption characteristic than could be obtained with PbO alone. By further varying the specific weight ratio for each of the aforementioned X-ray absorbing constituents in the glass while still maintaining the criteria set forth upon both individual and aggregate contents, there can be obtained an individual glass exhibiting the desired X-ray absorption as well as the further desired chemical and other physical properties.

Various other compatible metal oxides up to approximately 5% of the total glass composition may be included to aid in further modifying the physical and chemical properties of the glass compositions. For example, CaO can be helpful to increase the viscosity temperature and thereby facilitate sealing of the glass to other glasses and metals. Small quantities of $ZrO_2$, SrO and ZnO, while also not essential to the glass compositions, can be added to adjust the physical properties. SrO will improve the X-ray absorption property of the glass slightly, and ZnO raises the strain and anneal points of the glass while raising the softening point and reducing the glass expansion. Increase of the alkali metal oxide content within the ranges above specified can compensate for any higher softening point or reduction in the glass expansion if found detrimental for a particular application. Finally, such refining agents as $As_2O_3$ can be used in a range of approximately 0–1% as a refining agent although the presence of $Sb_2O_3$ in the glass can accomplish the same purpose.

Examples of the glass compositions of the present invention and their properties are given in Table I below. This table also contains a comparison with a standard No. 819 glass which is currently being used in the manufacture of high voltage rectifier and shunt regulator tubes.

TABLE I

Compositions and Properties of Some X-Radiation Absorbing Glasses

| Wt. % | Standard Glass | 1 | 2 | 3 | 4 | 5 | 6 | 7 |
|---|---|---|---|---|---|---|---|---|
| $SiO_2$ | 38.1 | 35.4 | 33.9 | 31.0 | 32.5 | 34.0 | 33.0 | 34.0 |
| PbO | 50.7 | 45.0 | 46.0 | 43.3 | 46.1 | 40.0 | 42.0 | 42.5 |
| $Al_2O_3$ | 0.5 | 2.0 | 2.0 | 3.0 | 2.7 | 3.0 | 2.0 | 2.0 |
| $K_2O$ | 6.8 | 5.8 | 5.3 | 4.5 | 5.2 | 5.3 | 5.3 | 5.3 |
| BaO | 1.0 | 11.0 | 12.0 | 9.5 | 8.5 | 10.0 | 6.0 | 7.0 |
| $Na_2O$ | 0.6 | 0.7 | 0.7 | 0.7 | 0.7 | 0.7 | 0.7 | 0.7 |
| CaO | 0.7 | — | — | — | — | — | — | — |
| MgO | 0.5 | — | — | — | — | — | — | — |
| $B_2O_3$ | 1.0 | — | — | — | — | — | 1.0 | 0.5 |
| $Sb_2O_3$ | 0.1 | 0.1 | 0.1 | 8.0 | 4.3 | 7.0 | 3.0 | 4.0 |
| CdO | — | — | — | — | — | — | 7.0 | 4.0 |
| Density gm/cc | 3.94 | 4.09 | 4.07 | 4.04 | 4.07 | 3.95 | 4.0599 | 4.0341 |
| Expansion $\times 10^{-7}$/°C | 88.0 | 9.15 | 91.1 | 84.7 | 88.8 | 87.3 | 85.9 | 86.8 |
| Working Range °C | 258 | 252 | 237 | 248 | 242 | 260 | 243 | 250 |

Table II below shows the improved X-ray absorption characteristics for the glasses listed in Table I. In the Table II comparison, the X-radiation percent transmission for 0.122-inch-thick pieces of the glass is shown as a function of the X-ray operating voltage.

TABLE II

Compositions and Properties of Some X-Radiation Absorbing Glasses

| λ | Operating Voltage | Standard Glass | % Trans. at 0.122" Thick | | | | | | |
|---|---|---|---|---|---|---|---|---|---|
| | | | 1 | 2 | 3 | 4 | 5 | 6 | 7 |
| 0.50 A | 25 kv | $6.17 \times 10^{-4}$ | $7.12 \times 10^{-4}$ | $5.49 \times 10^{-4}$ | $9.12 \times 10^{-4}$ | $5.65 \times 10^{-4}$ | $2.43 \times 10^{-3}$ | $1.41 \times 10^{-3}$ | $1.36 \times 10^{-3}$ |
| 0.41 A | 30 kv | 0.063 | 0.068 | 0.058 | 0.079 | 0.059 | 0.146 | 0.038 | 0.058 |
| 0.39 A | 32 kv | 0.200 | 0.214 | 0.187 | 0.088 | 0.111 | 0.170 | 0.093 | 0.115 |
| 0.36 A | 35 kv | 0.747 | 0.791 | 0.711 | 0.399 | 0.475 | 0.668 | 0.418 | 0.490 |
| 0.33 A | 38 kv | 1.767 | 0.625 | 0.517 | 0.428 | 0.547 | 0.635 | 0.653 | 0.669 |
| 0.31 A | 40 kv | 2.965 | 1.209 | 1.205 | 0.881 | 1.077 | 1.23 | 1.259 | 1.28 |

It can be seen from the above Table II that glass compositions of the present invention provide from approximately 2 to 4 times more absorption capacity for X-rays produced in the 30–40 kv region compared with the conventional glass now being used which contains more PbO and 1% BaO.

The operating kilovoltages shown in the above table are simply related to the wavelength of the radiation produced. To convert from the operational kilovoltage to the equivalent wavelength of X-radiation produced at that kilovoltage, the following equation is used:

$$\lambda = 12.43/V$$

where $\lambda$ = the wavelength of the radiation produced in Angstrom units, A ($10^{-8}$ cm)

$V$ = the operational kilovoltage.

As can be seen from the above equation, the standard operational voltages of television picture tubes at 20–40 kv produce X-radiation in the approximate range of 0.3 – 0.7 A.

It can be appreciated from the foregoing description of exemplary embodiments for the glass compositions of the present invention that various modifications thereof can be made. For example, it is believed possible that still other X-ray absorbing elements could be found to further extend the range of X-ray absorption. Consequently, it is intended to limit the present invention only to the scope of the following claims.

What we claim as new and desire to secure by Letters Patent of the United States is:

1. In a high voltage vacuum tube having a glass envelope, the improvement in which said glass envelope is a glass which is highly absorbent to X-radiation in the wavelength range from 0.3 – 0.7 A consisting of, by weight: 30–40% $SiO_2$, 3–7% $K_2O$, 0–2% $Na_2O$, 0–3% $Al_2O_3$, 35–50% PbO, 0–15% BaO, 0–15% $Sb_2O_3$, and 0–15% CdO wherein the aggregate total of BaO + $Sb_2O_3$ + CdO is greater than 10% and the aggregate total of PbO + BaO + $Sb_2O_3$ + CdO is greater than 55%, said glass having an average coefficient of thermal expansion over the range 0° to 300°C from 85 to 93 × $10^{-7}$ cm/cm/°C and a working range greater than 240°C.

2. A vacuum tube as defined in claim 1 wherein the glass contains 5–10% BaO by weight.

3. A vacuum tube as defined in claim 1 wherein the glass contains 2—3% $Al_2O_3$ by weight.

4. A vacuum tube as defined in claim 1 wherein the glass has a working range from 250°C to 300°C.

* * * * *